US012707527B2

(12) United States Patent
Selvaganapathy et al.

(10) Patent No.: US 12,707,527 B2
(45) Date of Patent: Aug. 11, 2026

(54) MULTIPLE USER SUBSCRIBER IDENTITY MODULE (MUSIM) USER EQUIPMENT (UE) SWITCHING CONNECTION BETWEEN NETWORKS

(71) Applicant: Nokia Technologies Oy, Espoo (FI)

(72) Inventors: Srinivasan Selvaganapathy, Bangalore (IN); Faranaz Sabouri-Sichani, Aalborg (DK); Nuno Manuel Kiilerich Pratas, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 494 days.

(21) Appl. No.: 18/260,727

(22) PCT Filed: Nov. 18, 2021

(86) PCT No.: PCT/EP2021/082060
§ 371 (c)(1),
(2) Date: Jul. 7, 2023

(87) PCT Pub. No.: WO2022/152434
PCT Pub. Date: Jul. 21, 2022

(65) Prior Publication Data

US 2024/0056792 A1 Feb. 15, 2024

Related U.S. Application Data

(60) Provisional application No. 63/137,578, filed on Jan. 14, 2021.

(51) Int. Cl.
*H04W 76/27* (2018.01)
*H04W 8/20* (2009.01)
*H04W 88/06* (2009.01)

(52) U.S. Cl.
CPC .......... *H04W 76/27* (2018.02); *H04W 8/205* (2013.01); *H04W 88/06* (2013.01)

(58) Field of Classification Search
CPC ...... H04W 8/205; H04W 76/27; H04W 88/06
See application file for complete search history.

(56) References Cited

U.S. PATENT DOCUMENTS 10,623,946 B1 * 4/2020 Kumar .................. H04W 76/16
2016/0249408 A1 * 8/2016 Thiruvenkatachari ...................... H04W 76/38

(Continued)

FOREIGN PATENT DOCUMENTS

EP 3764677 A1 1/2021
EP 3800949 A1 * 4/2021 ............ H04W 76/27
WO 2020/064773 A1 4/2020

OTHER PUBLICATIONS

"Revised SID: Study on system enablers for multi-SIM devices", TSG SA Meeting #SP-83, SP-190248, Agenda: 17B.19, SA WG2, Mar. 20-22, 2019, 4 pages.

(Continued)

*Primary Examiner* — Lewis G West
(74) *Attorney, Agent, or Firm* — SQUIRE PATTON BOGGS (US) LLP

(57) ABSTRACT

Certain example embodiments provide systems, methods, apparatuses, and computer program products for multiple user subscriber identity module (MUSIM) user equipment (UE) switching connection between networks. The network may follow configured steps where no indication from the UE is used. The configuration may include different timers and/or other conditions to move between states on a radio resource control (RRC)-connected USIM.

18 Claims, 8 Drawing Sheets

(56) References Cited

U.S. PATENT DOCUMENTS

| | | | | |
|---|---|---|---|---|
| 2018/0160422 | A1 | 6/2018 | Pathak et al. | |
| 2018/0302914 | A1* | 10/2018 | da Silva | H04W 76/27 |
| 2020/0037345 | A1 | 1/2020 | Ryoo et al. | |
| 2021/0105866 | A1* | 4/2021 | Kavuri | H04W 76/27 |
| 2022/0210632 | A1* | 6/2022 | Tseng | H04W 8/183 |
| 2022/0264506 | A1* | 8/2022 | Kiss | H04W 68/02 |
| 2022/0330376 | A1* | 10/2022 | Sabouri-Sichani | H04W 48/18 |
| 2022/0338161 | A1* | 10/2022 | Pu | H04W 36/14 |
| 2022/0361143 | A1* | 11/2022 | Kumar | H04W 76/30 |
| 2022/0377702 | A1* | 11/2022 | Chun | H04W 76/30 |
| 2023/0045093 | A1* | 2/2023 | Liu | H04W 36/0011 |
| 2023/0045765 | A1* | 2/2023 | Youn | H04W 60/005 |
| 2023/0083832 | A1* | 3/2023 | Ke | H04W 60/005 |
| 2023/0121417 | A1* | 4/2023 | Sabouri-Sichani | H04W 76/30 370/329 |
| 2023/0171841 | A1* | 6/2023 | Tsai | H04W 76/30 |
| 2023/0254918 | A1* | 8/2023 | Gurumoorthy | H04W 8/24 455/435.1 |
| 2023/0262655 | A1* | 8/2023 | Li | H04W 68/02 455/458 |
| 2023/0328789 | A1* | 10/2023 | Pu | H04W 72/569 370/329 |
| 2023/0389119 | A1* | 11/2023 | Araujo | H04W 76/15 |
| 2024/0008143 | A1* | 1/2024 | Li | H04W 76/20 |
| 2024/0107409 | A1* | 3/2024 | Da Silva | H04W 36/0033 |

OTHER PUBLICATIONS

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; Study on system enablers for devices having multiple Universal Subscriber Identity Modules (USIM) (Release 17)", 3GPP TR 23.761, V1.1.1, Oct. 2020, pp. 1-108.

"New WID: Support for Multi-SIM devices in Rel-17", 3GPP TSG RAN Meeting #86, RP-193263, Agenda: 9.1.2, vivo, Dec. 9-12, 2019, 5 pages.

"LG A290 Triple SIM", LG, Retrieved on Oct. 17, 2022, Webpage available at : https://www.lg.com/ae/mobile-phones/lg-A290.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

International Search Report and Written Opinion received for corresponding Patent Cooperation Treaty Application No. PCT/EP2021/082060, dated Mar. 17, 2022, 12 pages.

"KI#3, SoI#4: update to support local leaving negotiation", SA WG2 Meeting #139e, S2-2004595, Agenda: 8.10, vivo, Jun. 1-12, 2020, 5 pages.

* cited by examiner 15
10
14
Memory
Processor
Transceiver
12
18

70
25
20
24
Memory
Processor
Transceiver
22
28

MULTIPLE USER SUBSCRIBER IDENTITY MODULE (MUSIM) USER EQUIPMENT (UE) SWITCHING CONNECTION BETWEEN NETWORKS

RELATED APPLICATION

This application was originally filed as PCT Application No. PCT/EP2021/082060 on Nov. 18, 2021, which claims priority from U.S. Provisional Application No. 63/137,578, filed on Jan. 14, 2021, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for multiple user subscriber identity module (MUSIM) user equipment (UE) switching connection between networks.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include providing, by a user equipment to one or more network nodes corresponding to one or more identity modules of the user equipment, information that the user equipment supports a leave indication from a network connection without waiting for an acknowledgement. The method may include receiving, from the one or more network nodes based on supporting the leave indication, a configuration for transitioning the one or more identity modules of one or more user equipment instances of the user equipment between radio resource control states. The one or more identity modules may be associated with the leave indication. The method may include providing, to a first network node, the leave indication for leaving the network connection associated with a first identity module. The user equipment may be in a radio resource control connected state to the first network node. The leave indication may imply the transitioning. The method may include transitioning a first radio resource control state of the first identity module to one of the one or more other radio resource control states based on satisfaction of one or more conditions upon providing the leave indication based on the received configuration.

In some embodiments, the first identity module may comprise a first user subscriber identity module, and a second identity module may comprise a second user subscriber identity module. In some embodiments, the transitioning may include transitioning the first radio resource control state from the radio resource control connected state to a radio resource control connected with connected discontinuous reception state upon providing the leave indication based on the configuration, transitioning a second radio resource control state from a radio resource control idle state or a radio resource control inactive state to the radio resource control connected state. This transitioning may further include transitioning the first identity module from the radio resource control connected with connected discontinuous reception state to the radio resource control connected state upon the second identity module transitioning from the radio resource control connected state to the radio resource control idle state or the radio resource control inactive state prior to expiration of the first timer, and stopping the first timer.

In some embodiments, the transitioning may include transitioning the first radio resource control state from the radio resource control connected state to a radio resource control connected with connected discontinuous reception state upon providing the leave indication based on the configuration, transitioning a second radio resource control state from a radio resource control idle state or a radio resource control inactive state to the radio resource control connected state, and starting a first timer. In addition, this transitioning may include transitioning the first identity module from the radio resource control connected with connected discontinuous reception state to a radio resource control inactive state based on expiration of the first timer and starting a second timer.

In some embodiments, the transitioning may include transitioning the first identity module from the radio resource control inactive state to the radio resource control connected state upon a second identity module transitioning from the radio resource control connected state to the radio resource control idle state or the radio resource control inactive state prior to expiration of the second timer, and stopping the second timer. In some embodiments, the transitioning may include transitioning the first identity module from the radio resource control inactive state to the radio resource control idle state after expiration of the second timer and maintaining the second identity module in the radio resource control connected state after expiration of the second timer. In some embodiments, the one or more conditions may comprise expiration of one or more timers. In some embodiments, the configuration may comprise a radio resource control state upon providing the leave indication, and at least one other radio resource control state upon an occurrence of the one or more conditions or based on expiration of one or more timers.

According to a second embodiment, a method may include receiving information that a user equipment supports a leave indication from a network connection without waiting for an acknowledgement. The method may include sending a configuration associated with transitioning one or more identity modules of one or more user equipment instances of the user equipment between radio resource control states based on satisfaction of one or more conditions.

In some embodiments, the one or more conditions may comprise expiration of one or more timers. In some embodiments, the configuration may comprise the one or more radio resource control states and values for the one or more timers. In some embodiments, the one or more configured radio resource control states may include one or more of a radio resource control connected state, a radio resource control connected with connected discontinuous reception state, a radio resource control idle state, or a radio resource control inactive state.

In some embodiments, the configured transitioning may include transitioning a first identity module from a radio resource control connected state to a radio resource control connected with connected discontinuous reception state upon providing the leave indication based on the configuration. Additionally, or alternatively, the configured transitioning may include transitioning the first identity from the radio resource control connected with connected discontinuous reception state to the radio resource control connected state upon a second identity module transitioning from the radio resource control connected state to a radio resource control idle state or a radio resource control inactive state prior to expiration of a first timer.

Additionally, or alternatively, the configured transitioning may include transitioning the first identity from the radio resource control connected with connected discontinuous reception state to the radio resource control inactive state after expiration of the first timer. Additionally, or alternatively, the configured transitioning may include transitioning the first identity from the radio resource control inactive state to the radio resource control connected state upon the second identity module being transitioned from the radio resource control connected state to the radio resource control idle state or the radio resource control inactive state prior to expiration of a second timer. Additionally, or alternatively, the configured transitioning may include transitioning the first identity module from the radio resource control inactive state to the radio resource control idle state after expiration of the second timer.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to cause the apparatus to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment or the second embodiment, or any of the variants discussed above.

A seventh embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein.

FIG. **8*a* illustrates an example block diagram of an apparatus, according to an embodiment.

DETAILED DESCRIPTION

Figure 1:
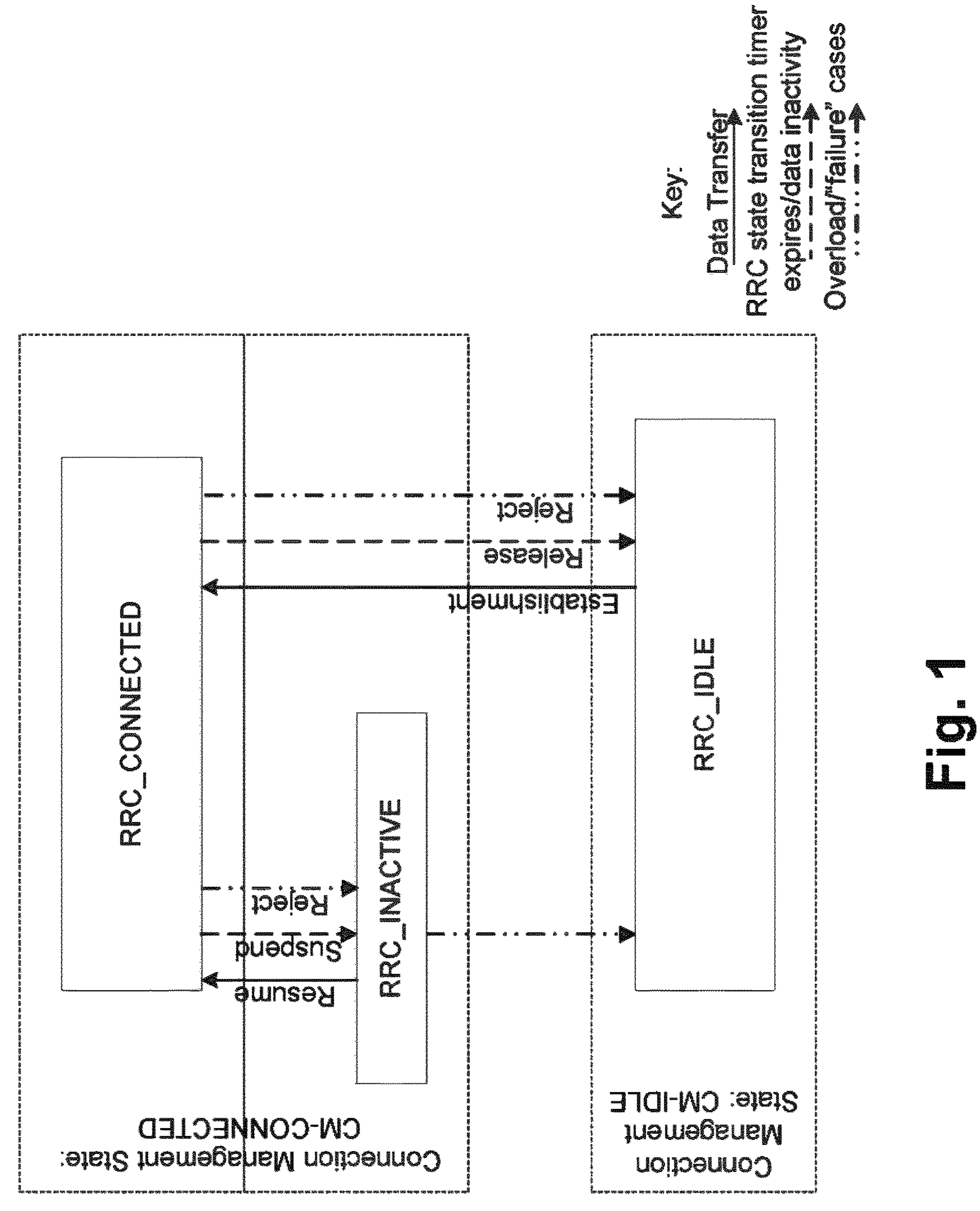
FIG. 1 illustrates a radio resource control (RRC) state machine.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for MUSIM UE switching connection between networks is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Aspects of NR may relate to coordinated leaving for an MUSIM device, and in particular, mechanisms for a UE to notify a network of its switch from the network (for MUSIM) purposes. A MUSIM device may have two or more simultaneous network subscriptions with multiple corresponding international mobile subscriber identities (IMSIs) in the case of an evolved packet system (EPS), or subscription permanent identifiers (SUPIs) in the case of a 5G system (5GS) (e.g., that are each associated with a particular subscription belonging to the same or different mobile network operator (MNO) or mobile virtual network operator (MVNO)). A MUSIM device may be connected to one or more gNBs with independent subscriptions. In some cases, the two subscriptions belonging to the same MNO and/or MVNO, registered with two independent identifiers (IDs) at the core network, may be using the same cell or neighboring cells as the serving cell. This can occur if the UE is at the edge between two or more cells and, due to load balancing or the handover procedures, one subscription may be assigned to a cell while the other subscription is assigned to another cell. In other cases, the two subscriptions may belong to different MNOs and may be using two neighboring or co-located cells from each MNO as serving cells.

Certain types of MUSIM devices may be referred to depending on the supported simultaneous RRC states on the USIMs. One example type of MUSIM device may include a dual SIM dual standby (DSDS) or MUSIM multi-standby (MUMS) device. This type of device may include MUSIM devices that are registered with two or more independent subscriber IDs (e.g., USIMs) and that can be in an RRC idle mode on one or more USIMs. However, these types of devices can be in an RRC connected mode with a single USIM at a given time. Another example type of MUSIM device may include dual SIM dual active (DSDA) or multi-USIM multi-active (MUMA) devices. This type of device may include MUSIM devices that are registered with two or more independent subscriber IDs (e.g., USIMs) and that can be in an RRC idle mode on one or more USIMs. In addition, these types of devices can maintain RRC connected mode activities on one or more USIMs.

Furthermore, the UE's operations with respect to the simultaneous handling of multiple USIMs may depend on the UE's capabilities. These capabilities may include single reception (Rx) and single transmission (Tx), where the UE may be capable of receiving traffic from one network and and/or transmitting traffic to one network at a time (type 1). Additionally, or alternatively, these capabilities may include dual Rx and single Tx, where the UE may be capable of simultaneously receiving traffic from two networks but may be capable of transmitting to one network at a time (type 2). Additionally, or alternatively, these capabilities may include dual Rx and dual Tx, where the UE may be capable of simultaneously receiving and/or transmitting to or from two networks (type 3). Some UEs may support two or more USIMS. Especially, with the introduction of electronic SIM (e-SIM), it is expected that some UEs may support more than two or three USIMs.

In addition to the above, NR may include procedures for standalone NR initial access. Specifically, these procedures may include a transition of the UE from an RRC idle mode to an RRC connected mode, which may correspond to a connection establishment step in the RRC state machine 100 depicted in FIG. 1. The connection establishment procedure (the transition of the UE state from the RRC idle mode to the RRC connected mode) may include a first step (an RRC setup request) may be carried either in a message 3 (Msg3) when 4-step random access channel (RACH) is used (Type I RACH) or in a message A (MsgA) physical uplink shared channel (PUSCH) when 2-step RACH is used (Type II RACH).

Furthermore, NR may include procedures related to RRC state transitions on DSDS MUSIM devices. For instance, whenever one USIM is in an RRC connected mode, the other USIM may be in either an RRC idle mode or an RRC inactive mode.

One problem associated with MUSIM operation is that UEs that are not dual Rx and/or dual Tx capable may have to (time) share their resources to support concurrent activities across multiple USIMs in case they happen to collide in time. For example, dual Rx and single Tx UEs can, in some cases (based on UE capabilities), read a system information block (SIB), perform radio resource management (RRM) measurements, or monitor paging from two USIMs at the same time. However, a single-or-dual Rx and/or single Tx device may not be capable of maintaining two RRC connections simultaneously without interruption. For those UEs whose transceiver capabilities do not allow or support the operation of multiple simultaneous active RRC connections, whenever a USIM is in RRC connected state in one USIM, then the UE may have to leave this on-going RRC connection in order to be able to, e.g., respond to a paging at another USIM.

There may be situations related to a single Rx and/or single Tx DSDS UE, where the UE is in idle mode operation in one of its USIMs (e.g., towards network A) while having an active connection with another USIM (e.g., network B). Then, when the UE instance associated with the idle mode USIM (with network A) receives a paging message, the UE may determine the paging to have less priority compared to its connection and may just send a short indication, such as a busy indication, to the network A. The UE may determine the paging to have a higher priority compared to its connection and may release the on-going connection and move to connected mode with network A and may release locally the RRC connection with network B.

One problem is that it may not be known how much time the UE may need to have for a mobile originated (MO) or a high priority mobile terminated (MT) call. Thus, a complete leave of the network B may not be efficient and may have a high impact on the ongoing connection to the network B. Furthermore, the UE may not have enough time to indicate that it is leaving the network B and wait for network acknowledgement before it can leave and establish an RRC connection to the network A. Based on this, there may be a need to enable a low latency leave indication (without network acknowledgement). Additionally, or alternatively, there may be a need to reduce or eliminate excessive RRC state transitions. These may be applicable in scenarios where the network and the UE may not know when the UE may be able to return to its current RRC connection.

Some embodiments described herein may provide for MUSIM UE switching connection between networks. For example, certain embodiments may provide for a signalling procedure that enables a single or dual Rx and/or single Tx DSDS UE to select a correct RRC state at each of its USIMs, depending on the current observed leave duration at the UE.

In certain embodiments, the network may request and receive information from the UE related to whether the UE supports a leave indication without waiting for an acknowledgement (ACK) (e.g., via RRC UE capabilities reporting). The network may configure the UE with a stepwise RRC state change, when one of the UE's USIMs is in an RRC connected mode and may have to leave this connection for transitioning to an RRC connected state with the network associated with its other USIM. The UE may transition to a dormant RRC connected state (RRC connected with C-DRX) with its connected mode USIM after providing the leave indication (RRC Leave) to the network and may apply the inactivity time to establish RRC connection with its second USIM.

The network may follow the configured steps where no indication from the UE is used (e.g., the RRC state transitions controlled directly by the network may still be the same). The configuration may include different timers and/or other conditions to move between (non-limiting) states on the RRC connected USIM. The state transitions according to certain embodiments may be illustrated in FIG. 2.

Figure 2:
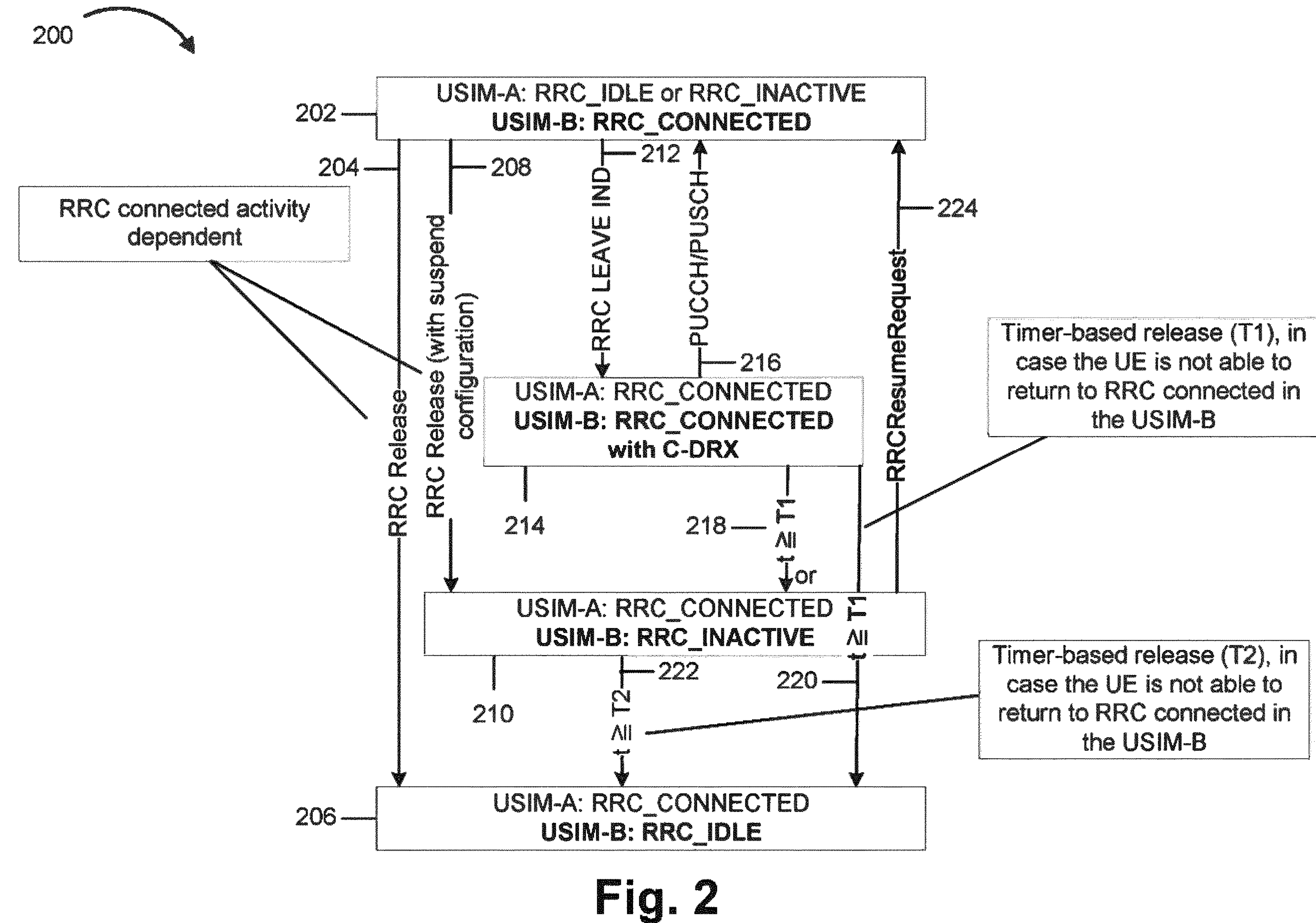
FIG. 2 illustrates an example of pre-configured state transitions at a UE toward each network associated with the UE's MUSIMs, according to some embodiments.

FIG. 2 illustrates an example 200 of pre-configured state transitions at a UE toward each network associated with the UE's MUSIMs, according to some embodiments. In the example 200 of FIG. 2, the USIM-A may be a first USIM and the USIM-B may be a second USIM. In addition, various timers may be utilized in connection with the example 200. T1 may be the timer that controls when a USIM in an RRC connected with C-DRX state transitions to either an RRC inactive state or RRC idle state (the actual transition may be part of the configuration). T2 may be the timer that controls when a USIM in an RRC inactive state (that was transitioned to this state after the elapse of T1) transitions to the RRC idle state.

As illustrated at 202, the USIM-A may be in an RRC idle state ("RRC_IDLE") or an RRC inactive state ("RRC_INACTIVE"), and the USIM-B may be in an RRC connected state ("RRC_CONNECTED"). As illustrated at 204, an RRC release message may transition the USIM-A and the USIM-B to new states, which are illustrated at 206. For example, the USIM-A may be transitioned to the RRC connected state and the USIM-B may be transitioned to the RRC idle state. As illustrated at 208, an RRC release message (with a suspend configuration) may transition the USIM-A and the USIM-B to new states, which are illustrated at 210. For example, the USIM-A may be transitioned to the RRC connected state, and the USIM-B may be transitioned to the RRC inactive state. In certain embodiments, the operations illustrated at 206 and 208 may be RRC connected activity dependent.

As illustrated at 212, an RRC leave indication ("RRC LEAVE IND") may transition the USIM-A and the USIM-B to new states, which are illustrated at 214. For example, the USIM-A may be transitioned to the RRC connected state and the USIM-B may be transitioned to an RRC connected with discontinuous reception state ("RRC_CONNECTED w C-DRX"). As illustrated at 216, a physical uplink control channel (PUCCH) and/or PUSCH message may transition the USIM-A and USIM-B may be transitioned back to the states illustrated at 202.

As illustrated at 218, the USIM-A and USIM-B states illustrated at 214 may be transitioned to the states illustrated at 210 or, as illustrated at 220, to the states illustrated at 206. These transitions may occur based on the expiration of timer T1. The transition at 220 may be a timer-based release (based on T1), in cases where the UE is not able to return to the RRC connected state in the USIM.

As illustrated at 222, the states at 210 may be transitioned to the states at 206 based on expiration of timer T2. As illustrated at 224, the states illustrated at 210 may be transitioned to the states illustrated at 202 based on an RRC resume request ("RRCResumeRequest"). The transition at 222 may be a time-based release (based on T2), in the case where the UE is not able to return to the RRC connected state in the USIM.

As described above, FIG. 2 is provided as an example. Other examples are possible, according to some embodiments.

Figure 3:
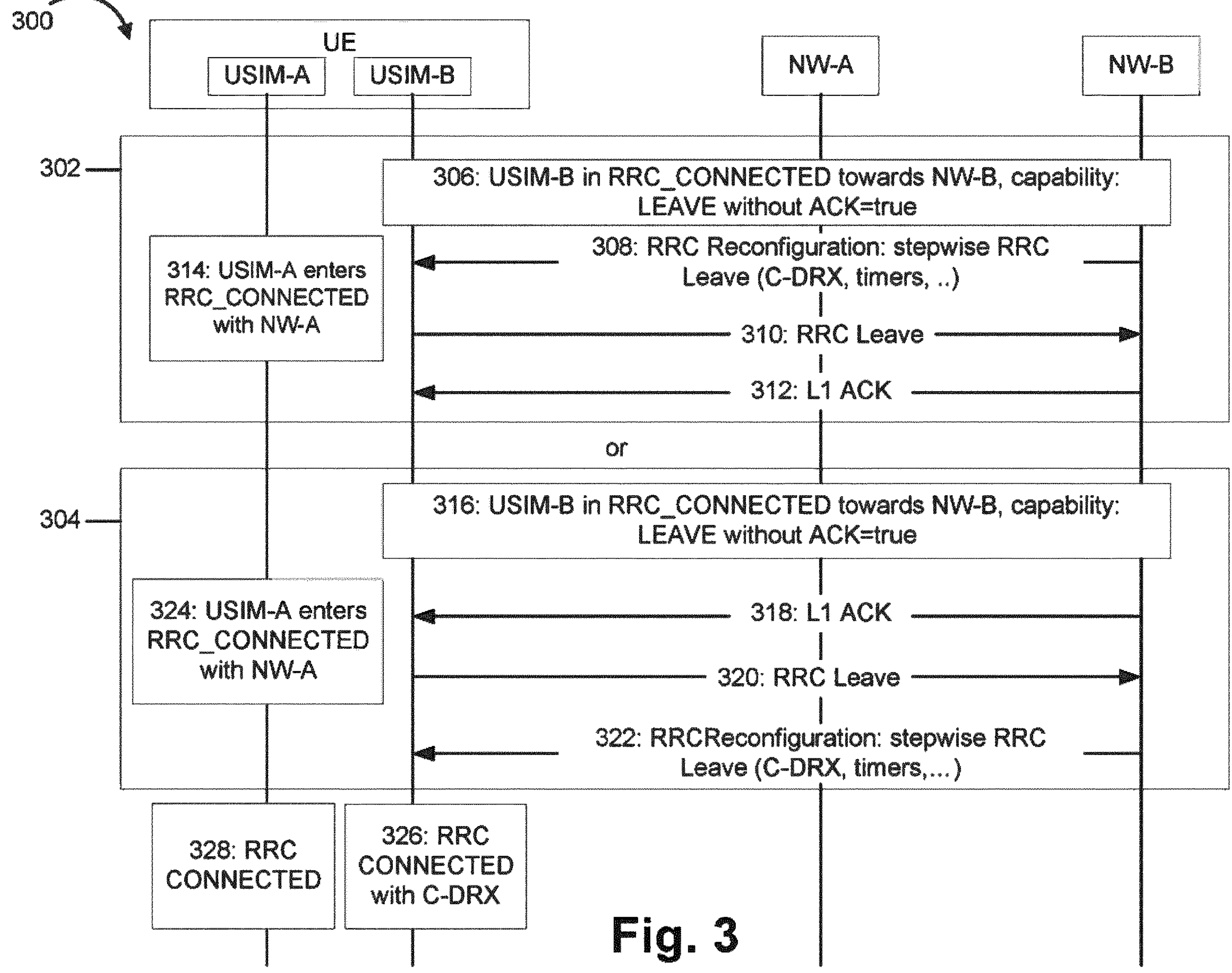
FIG. 3 illustrates an example of configuration of a stepwise radio resource control (RRC) leave, according to some embodiments.

FIG. 3 illustrates an example 300 of configuration of a stepwise radio resource control (RRC) leave, according to some embodiments. As illustrated in FIG. 3, the example 300 includes a UE, which comprises a USIM-A and a USIM-B, a network A ("NW-A"), and a network B ("NW-B"). The example 300 includes two exemplary sets of operations illustrated at 302 and 304 for configuration of USIM-B stepwise leave and transmission of leave indication. In certain embodiments, the operations sets 302, 304 may be alternative sets of operations to each other.

With respect to the operation set 302, as illustrated at 306, the USIM-B may inform the network (NW) that it supports a leave indication without waiting for an acknowledgement (ACK). This can be part of a UE capability reporting or a dedicated RRC signal. Although FIG. 3 illustrates the UE informing the NW-B, corresponding to the UE's subscriber identity module USIM-B, the UE may, in certain embodiments, inform both the NW-B and the NW-A that it supports a leave indication without waiting for an ACK. The same applies to operation 316 below. The USIM-B may be RRC connected towards the NW-B. As illustrated at 308, USIM-B may be pre-configured to use a stepwise RRC leave procedure when it is in the RRC connected mode and may have to leave this connection for an RRC connection with the NW-A associated with the UE's other USIM (USIM-A). As illustrated at 310, when the USIM-A may, for example, have to make an MO call to the network associated with its other USIM or receives a paging it determines to respond to, the USIM-B may inform the NW-B with an RRC leave indication. In certain embodiments, the leave indication may be a medium access control element (MAC CE). As illustrated at 312, USIM-B is already preconfigured for stepwise RRC leave, and the NW-B may send a layer 1 (L1) ACK, which may acknowledge the reception of the RRC leave indication (or leave indication MAC CE). The USIM-B may then transition to the RRC connected with C-DRX state and may start the T1 timer value indicated at 308. As illustrated at 314, the USIM-A may enter the RRC connected state with NW-A.

With respect to the operations set 304, the operations at 316 may be similar to the operations illustrated at 306. As illustrated at 318, the USIM-B may receive a L1 ACK indicating that the leave indication without waiting for ACK capability has been received by the NW-B and that the USIM-B is allowed to transmit an RRC leave indication when applicable. The operations illustrated at 320 may be similar to the operations illustrated at 310. As illustrated at 322, in case the USIM-B is not yet configured for stepwise RRC leave (operation 318), the USIM-B may be configured with a C-DRX configuration (similar to a long DRX) and a T1 timer. The USIM-B may then be transitioned to the RRC connected with C-DRX state and may apply the T1 timer, as illustrated at 326. As illustrated at 328, the USIM-A may transition to the RRC connected state.

With respect to the operations sets 302, 304, if the UE determines to use different operations than the configuration of certain embodiments, e.g., if the UE determines that it has to move to the RRC inactive state or the RRC idle state (irrespective of duration), the UE can indicate this in its RRC leave message. For example, the UE may provide its leave preference (e.g., the UE can indicate a preference for leave with ACK and without ACK). In this case, the network may acknowledge and follow the UE requested state. The stepwise RRC leave configuration parameters, such as long DRX (C-DRX) configuration and timers, may be informed as part of an RRC reconfiguration message provided to the UE at 308 or at 322. In certain embodiments, the DRX used in RRC connected state and the MUSIM RRC connected with C-DRX state may be the same (e.g., a MUSIM-specific C-DRX may be defined and activated per default). This configuration may provide power saving at the UE if not used by the UE's other USIM and may avoid the need for signalling related to changing RRC states. The NW-B may provide configured grants (PUSCH resources) or scheduling request assignments for the UE in the next DRX-ON occurrence(s) for the UE to use at its return. The configuration that allows USIM-B to transition to the RRC inactive state (upon the expiration of the T1 timer) may include the same information present in the RRC release message (e.g., an inactive radio network temporary identifier (I-RNTI), network color code (NCC), etc.). In certain embodiments, a transition may be performed without signalling from a network. In this way, the USIM-B may already have the RRC release information, and may apply it when the T1 timer expires.

As indicated above, FIG. 3 is provided as an example. Other examples are possible, according to some embodiments.

Figure 4:
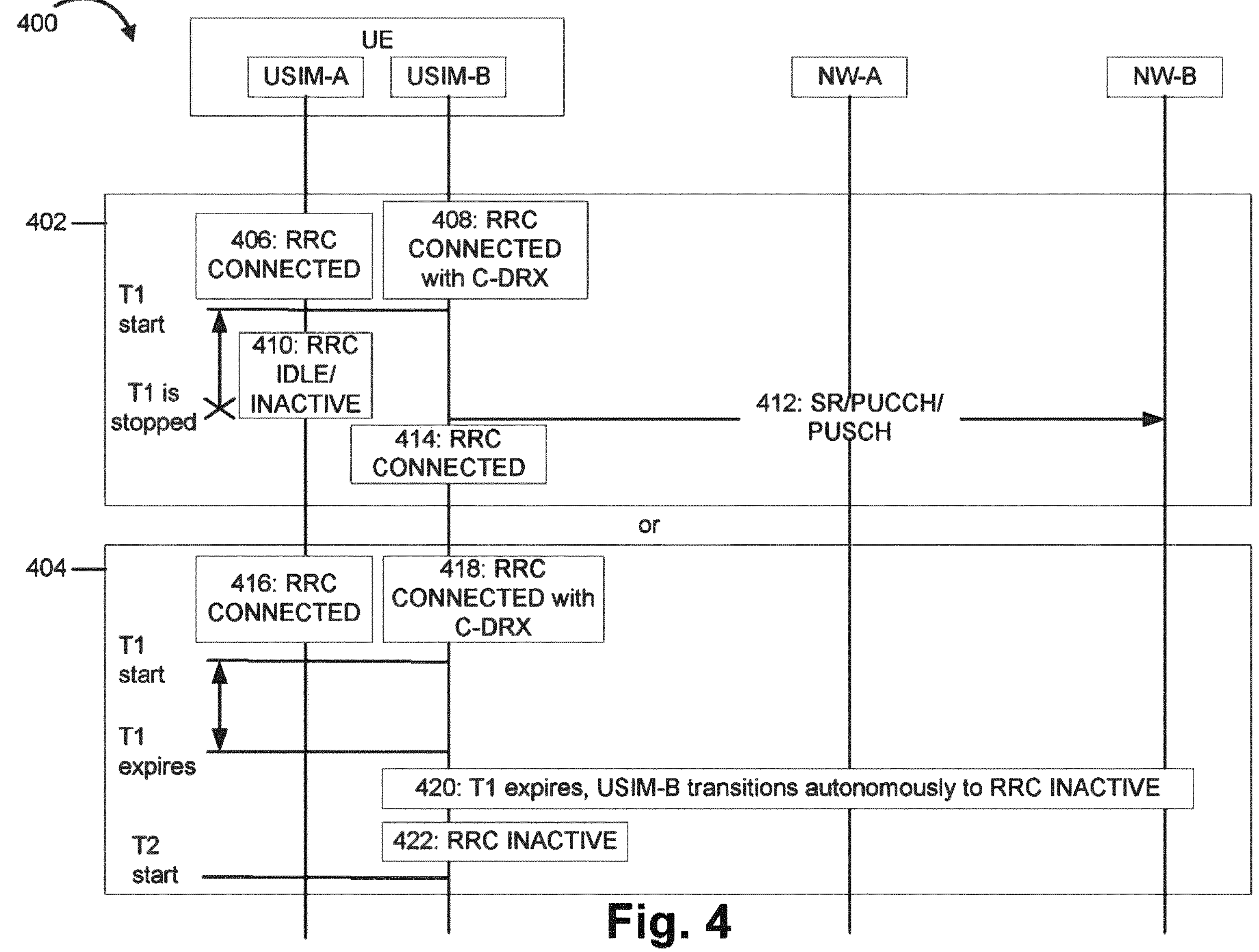
FIG. 4 illustrates an example of operations after USIM transition to an RRC connected with connected discontinuous reception (C-DRX) state, according to some embodiments.

FIG. 4 illustrates an example of operations after USIM transition to an RRC connected with C-DRX state, according to some embodiments. As illustrated in FIG. 4, the example 400 includes a UE, which comprises a USIM-A and a USIM-B, a network A ("NW-A"), and a network B ("NW-B"). The example 400 includes two sets of operations illustrated at 402 and 404 for operations after USIM-B transition to the RRC connected with C-DRX state, which is illustrated in FIG. 3 at 326. In other words, in certain embodiments, the operations illustrated in FIG. 4 may continue after the operations illustrated in FIG. 3. In certain embodiments, the sets 402, 404 may be alternative sets of operations to each other.

As illustrated at 406, the USIM-A may be in the RRC connected state (towards the NW-A) and, as illustrated at 408, the USIM-B may be in the RRC connected with C-DRX state (towards the NW-B). The USIM-A and USIM-B may have transitioned to these states at 326 and 328 of FIG. 3. When the USIM-B has transitioned to the RRC connected with C-DRX state, the UE may start a first configured timer T1 in connection with the USIM-B state.

If the USIM-A leaves the RRC connected state before the timer T1 expires, then the UE may perform various operations of the operations set 302. As illustrated at 410, the USIM-A may transition to the RRC idle and/or inactive states (e.g., the NW-A may instruct the USIM-A to perform the transition). As illustrated at 412, the UE may stop the T1 timer and the USIM-B may perform a transmission towards the NW-B in pre-reserved resources (e.g., a configured grant or scheduling request resources that can be part of the configuration of stepwise RRC leave provided by the NW-B). The pre-reserved resources may include a scheduling request (SR), a PUCCH, and/or a PUSCH. As illustrated at 414, the USIM-B may transition to the RRC connected state and may retain the USIM-B's context (the context before the transition to the RRC connected with C-DRX state).

If the USIM-A is still in the RRC connected state after the timer T1 expires, then the UE may perform the various operations of the operations set 404. As illustrated at 416, the USIM-A may be in the RRC connected state (towards the NW-A) and, as illustrated at 418, the USIM-B may be in the RRC connected with C-DRX state (towards the NW-B). The USIM-A and USIM-B may have transitioned to these states at 326 and 328 of FIG. 3. Similar to that described above, the UE may start the timer T1 in connection with the USIM-B state. As illustrated at 420, the timer T1 may expire while the USIM-A is still in the RRC connected state, and the USIM-B may transition to the RRC inactive state (as indicated in the leave indication procedure configuration and may apply the RRC release configuration previously received). In certain embodiments, the USIM-B may be configured by the NW-B to transition directly to the RRC idle at the timer T1 expiry. As illustrated at 422, the USIM-B may be in the RRC inactive state and the UE may start the timer T2 with respect to the USIM B. In certain embodiments, in the case of a leave configuration, the USIM-B may be in RRC idle state at 422 and no new timer may be started.

As described above, FIG. 4 is provided as an example. Other examples are possible, according to some embodiments.

Figure 5:
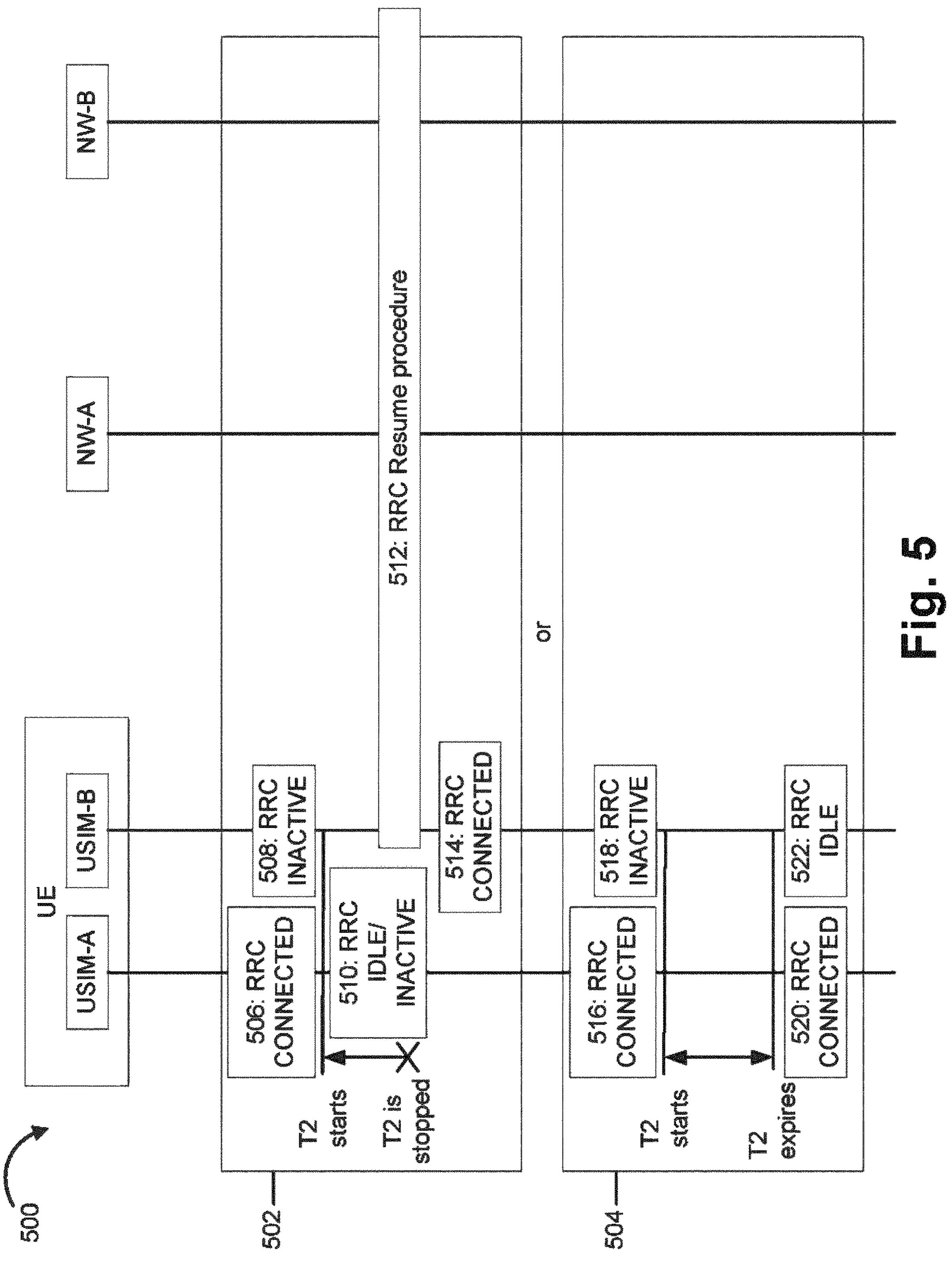
FIG. 5 illustrates an example of operations after USIM transition to an RRC inactive state, according to some embodiments.

FIG. 5 illustrates an example of operations after USIM transition to an RRC inactive state, according to some embodiments. As illustrated in FIG. 5, the example 500 includes a UE, which comprises a USIM-A and a USIM-B, a network A ("NW-A"), and a network B ("NW-B"). The example 500 includes two operations sets 502, 504 for operations after USIM-B transition to the RRC inactive state, which is illustrated in FIG. 4 at 422. In certain embodiments, the sets 502, 504 may be alternative sets of operations to each other. The UE may be in the RRC inactive state that was entered at 422 of FIG. 4. In other words, in certain embodiments, the operations illustrated in FIG. 5 may continue after the operations illustrated in FIG. 4. Certain operations illustrated in, and described with respect to, FIG. 5 may be performed in cases where the USIM-B may be configured with various leave steps and corresponding timers T1, T2.

As illustrated at 506, the USIM-A may be in the RRC connected state (towards the NW-A) and, as illustrated at 508, the USIM-B may be in the RRC inactive state (towards the NW-B). The UE may start the timer T2 in connection with the USIM-B's state. When the USIM-B has transitioned to the RRC inactive state (and has applied the RRC release information), the USIM-B may start a second configured timer T2. If the USIM-A leaves the RRC connected state before the timer T2 expires, then other operations of operations set 502 may be performed. As illustrated at 510, the USIM-A may transition to the RRC idle and/or inactive states (e.g., the NW-A may instruct the USIM-A to transition).

As illustrated at 512, the UE may stop the timer T2 (in reference to the USIM B) and the USIM-B may initiate the RRC resume procedure towards the NW-B. As illustrated at 514, the USIM-B may transition to the RRC connected state and may resume the previously stored context.

As illustrated at 516, the USIM-A may be in the RRC connected state (towards the NW-A) and, as illustrated at 518, the USIM-B may be in the RRC inactive state (towards the NW-B). The UE may start the timer T2 in connection with the USIM-B state. The timer T2 may expire while the USIM-A is still in the RRC connected state, as illustrated at 520, and the USIM-B may transition to the RRC idle state, as illustrated at 522. The USIM-B may release stored information related to the RRC inactive state. In case the USIM B has to transition to the RRC connected state towards the NW-B, the USIM-B may perform the RRC connection request procedure.

As described above, FIG. 5 is provided as an example. Other examples are possible, according to some embodiments.

As explained above, certain embodiments described herein may apply to a scenario where the UE is in an RRC connected state in one USIM (e.g., USIM-A) and an RRC idle and/or inactive state in another USIM (e.g., the USIM-B). In this scenario, the UE may determine to setup an RRC connection in a second network and may provide a leave indication in the current first network. In addition, in this scenario, the first network and the UE may not know the return time from the second network (e.g., the first network may know for how long the UE may be absent from the first network, as it may depend on the UE's activity on the second network).

In this scenario, there may be problems with long delay during state transition that may be caused by one or more factors. As one example factor, the UE may inform and/or request to leave and may wait for an ACK from the first NW, where this waiting for the ACK adds delay. As another example factor, the UE may spend excess time in state changes, as explained above.

According to certain embodiments, the first network may pre-configure different states for the UE to return to after releasing the RRC connection in the second network in a stepwise manner with an associated timer as pre-configuration. As the duration of leave from the first network may be unpredictable, a direct switching to the idle or inactive states may not have to be performed. Hence, the stepwise approach may allow the UE to be absent from the first network starting with a short interruption and gradually change to other states without new signalling if more time is needed. Without certain embodiments described herein, if a UE is moved to the RRC inactive and/or idle states directly, but is able to return after short time, the UE might still have to have the RRC connection establishment (from the idle state) or the resume (from the inactive state) to return to the first network.

In this way, in certain embodiments, the UE may stay in the connected state for that short absence and may reduce or eliminate the signalling and time to change states. In addition, certain embodiments may provide an RRC leave procedure with one or more phases. As one example phase, for a USIM in the RRC connected state, the UE may immediately enter a DRX off duration (long cycle or another specific cycle). As another example phase, after timer T1, the UE may enter an RRC inactive state with respect to a USIM. As another example phase, after time T2, the UE may enter the RRC idle state with respect to a USIM. A UE command may start a procedure that includes a RRC message, such as a RRC leave message, or a MAC CE, such as an uplink scheduling logical channel identifier (UL-SCHD LCID) for the long DRX command.

The UE may perform an RRC configuration to allow automatic transition through the phases described above without further signaling (e.g., the UE may be configured with one or more of a specific DRX cycle, a configuration suspend (suspendConfig), a timer T1, and a timer T2). The UE may be pre-configured with the RRC configuration in advance of the UE sending command for the UE to avoid waiting for an RRC response message to RRC leave the first network and/or to allow using a MAC CE.

The RRC connected with C-DRX state may be used for a UE power saving scenario. Ordinarily, a gNB may send an RRC release command to trigger a UE to transition from the RRC connected state into the RRC inactive state (suspendConfig included) or the RRC idle state (suspendConfig may not be included in the RRC release message). However, in certain embodiments, the signalling may not be needed, and the UE may shift to different states when a relevant timer expires.

Figure 6:
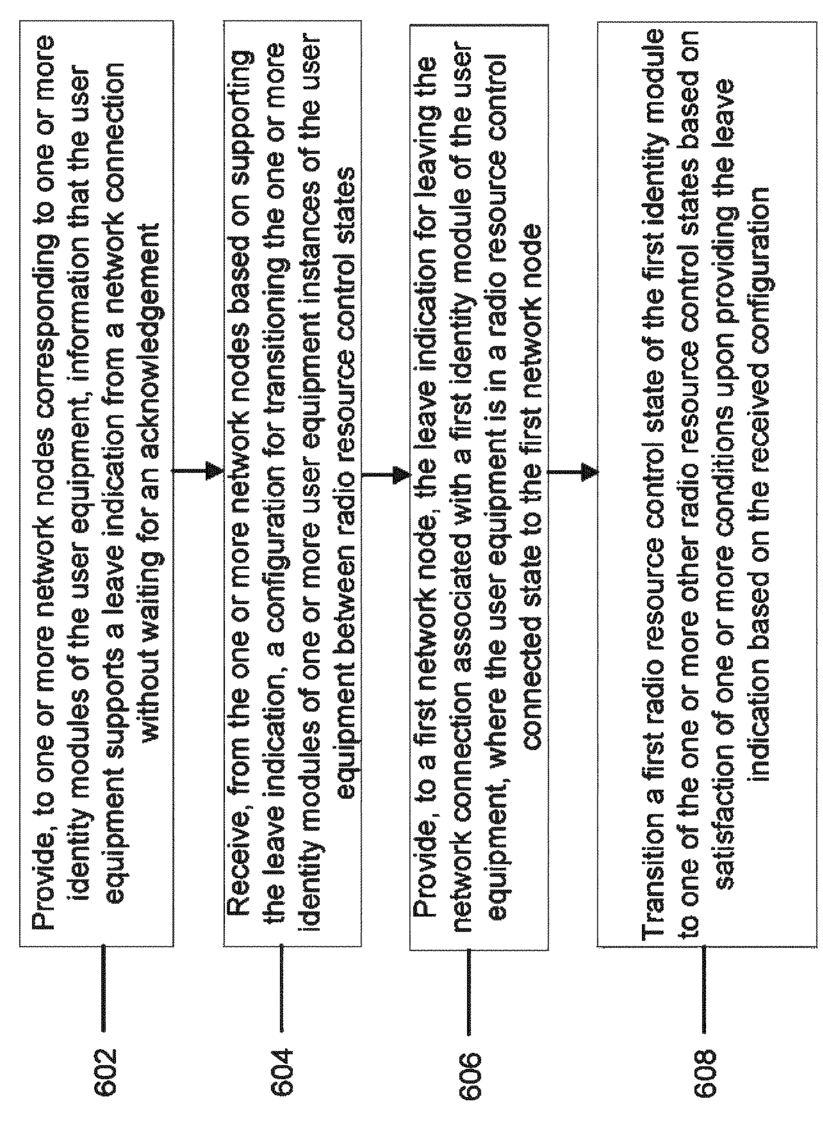
FIG. 6 illustrates an example flow diagram of a method, according to some embodiments.

FIG. 6 illustrates an example flow diagram of a method 600, according to some embodiments. For example, FIG. 6 may illustrate example operations of a UE (e.g., apparatus 20 illustrated in, and described with respect to, FIG. 8*b*). Some of the operations illustrated in FIG. 6 may be similar to some operations shown in, and described with respect to, FIGS. 1-4.

In an embodiment, the method may include, at 602, providing, to one or more network nodes corresponding to one or more identity modules of the user equipment, information that the user equipment supports a leave indication from a network connection without waiting for an acknowledgement. For example, the providing may be similar to that at 306 or 316 of FIG. 3. In some embodiments, the UE may provide the information to NW-A and/or NW-B. The method may include, at 604, receiving, from the one or more network nodes based on supporting the leave indication, a configuration for transitioning the one or more identity modules (e.g., USIMs) of one or more user equipment instances of the user equipment between radio resource control states (e.g., where each UE instance may be associated with an identifier and information may correspond to a subscriber identity module). For example, the receiving may be similar to that at 308 or 322 of FIG. 3. A UE instance may include a set of protocols associated with an identity of the UE. The one or more identity modules may be associated with the leave indication.

The method may include, at 606, providing, to a first network node, the leave indication for leaving the network connection associated with a first identity module (e.g., USIM-B of FIGS. 2-4) of the user equipment. For example, the providing may be similar to that at 312 or 318 of FIG. 3. The user equipment may be in a radio resource control connected state to the first network node. The leave indication may imply the transitioning. The method may include, at 608, transitioning a first radio resource control state of the first identity module to one of the one or more other radio resource control states based on satisfaction of one or more conditions upon providing the leave indication based on the received configuration. For example, the transitioning may be similar to that at 326 of FIG. 3, at 410, 414, or 422 of FIG. 4, and/or at 510, 514, or 522 of FIG. 5. The UE may be a MUSIM UE, in connected mode with a first USIM (e.g., USIM-B in a RRC_CONNECTED state towards NW-B), and may need to communicate with another network (e.g., NW-A) with a second USIM (e.g., USIM-A).

In this way, a UE may provide information regarding support of leave without ACK to NW-A and/or NW-B, and if the network supports leave without ACK, the network may provide the UE with a configuration to use at leave. The UE may be in RRC_CONNECTED mode with a first network (e.g., NW-B) and in RRC_IDLE or RRC_INACTIVE with the second network (e.g., NW-A). The first state of the first identity module may be transitioned according to a configuration to the first network (e.g., the RRC_CONNECTED state of the USIM-B may be transitioned according to a configuration received from NW-B). In addition, one or more other states may be transitioned (e.g., the RRC_IDLE or RRC_INACTIVE state of the USIM-A may be transitioned).

The method illustrated in FIG. 6 may include one or more additional aspects described below or elsewhere herein. In some embodiments, the first identity module may comprise a first user subscriber identity module, and a second identity module may comprise a second user subscriber identity module. In some embodiments, the transitioning at 608 may include transitioning the first radio resource control state from the radio resource control connected state to a radio resource control connected with connected discontinuous reception state upon providing the leave indication based on the configuration (e.g., similar to the transition from the state at 316 or 308 of FIG. 3 to the state at 326), transitioning a second radio resource control state from a radio resource control idle state or a radio resource control inactive state to the radio resource control connected state (e.g., similar to the transition from the state at, and starting a first timer (e.g., T1 in set 302 of FIG. 4). This transitioning may further include transitioning the first identity module from the radio resource control connected with connected discontinuous reception state to the radio resource control connected state upon the second identity module transitioning from the radio resource control connected state to the radio resource control idle state or the radio resource control inactive state prior to expiration of the first timer (e.g., similar to the transition from the state at 408 to the state at 410 and from the state at 406 to the state at 410 of FIG. 4), and stopping the first timer.

In some embodiments, the transitioning at 608 may include transitioning the first radio resource control state from the radio resource control connected state to a radio resource control connected with connected discontinuous reception state upon providing the leave indication based on the configuration (e.g., similar to the transition from the state at 316 or 308 of FIG. 3 to the state at 326), transitioning a second radio resource control state from a radio resource control idle state or a radio resource control inactive state to the radio resource control connected state (e.g., similar to transitioning to the state at 314 or 324 of FIG. 3), and starting a first timer (e.g., T1 in set 404 of FIG. 4). In addition, this transitioning may include transitioning the first identity module from the radio resource control connected with connected discontinuous reception state to a radio resource control inactive state based on expiration of the first timer (e.g., similar to the transition from the state at 418 to the state at 422 of FIG. 4) and starting a second timer (e.g., T2 in set 404 of FIG. 4 or set 504 of FIG. 5). For a UE supporting leave indication without network response, the network may configure the state and conditions to be transitioned to the state from the time of leaving until the UE returns back to the current network. The configuration may include a UE state upon sending the leave indication, and then a next UE state upon a specific condition and/or timer, and next UE state based on a specific condition and/or timer. In some embodiments, the first state upon sending the leave indication can be connected with DRX, INACTIVE, and/or IDLE, the second state can be INACTIVE or IDLE, and the third state, if configured, can be an IDLE state.

In some embodiments, the transitioning at 608 may include transitioning the first identity module from the radio resource control inactive state to the radio resource control connected state (e.g., similar to the transition from the state at 508 to the state at 514 of FIG. 5) upon a second identity module transitioning from the radio resource control connected state to the radio resource control idle state or the radio resource control inactive state (e.g., similar to the transition from the state at 506 to the state at 510) prior to expiration of the second timer, and stopping the second timer. In some embodiments, the transitioning at 608 may include transitioning the first identity module from the radio resource control inactive state to the radio resource control idle state after expiration of the second timer (e.g., similar to the transition from the state at 518 to the state at 522 after expiration of T2 of the set 504 of FIG. 5) and maintaining the second identity module in the radio resource control connected state after expiration of the second timer (e.g., similar to the maintenance of the state at 516 to the state at 520 after expiration of time T2 of the operations set 504 of FIG. 5). In some embodiments, the one or more conditions may comprise expiration of one or more timers. In some embodiments, the configuration may comprise a radio resource control state upon providing the leave indication, and at least one other radio resource control state upon an occurrence of the one or more conditions or based on expiration of one or more timers.

As described above, FIG. 6 is provided as an example. Other examples are possible according to some embodiments.

Figure 7:
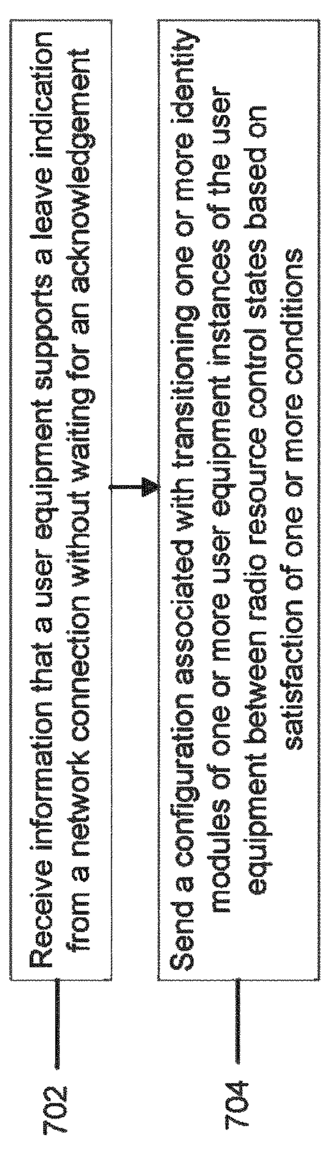
FIG. 7 illustrates an example flow diagram of a method, according to some embodiments.

FIG. 7 illustrates an example flow diagram of a method 700, according to some embodiments. For example, FIG. 7 may illustrate example operations of a network node (e.g., apparatus 10 illustrated in, and described with respect to, FIG. 8*a*). Some of the operations illustrated in FIG. 7 may be similar to some operations shown in, and described with respect to, FIGS. 1-4.

In an embodiment, the method may include, at 702, receiving information that a user equipment supports a leave indication from a network connection without waiting for an acknowledgement. For example, the receiving may be similar to that at 306 of FIG. 3. The method may include, at 704, sending a configuration associated with transitioning one or more identity modules of one or more user equipment instances of the user equipment between radio resource control states based on satisfaction of one or more conditions. For example, the sending may be similar to that at 308 or 322 of FIG. 3.

The method illustrated in FIG. 7 may include one or more additional aspects described below or elsewhere herein. In some embodiments, the one or more conditions may comprise expiration of one or more timers. In some embodiments, the configuration may comprise the one or more radio resource control states and values for the one or more timers (e.g., may configure certain radio resource control states, values for T1 or T2 of FIGS. 1-4, etc.). In some embodiments, the one or more configured radio resource control states may include one or more of a radio resource control connected state, a radio resource control connected with connected discontinuous reception state, a radio resource control idle state, or a radio resource control inactive state.

In some embodiments, the configured transitioning may include transitioning a first identity module (e.g., USIM-B) from a radio resource control connected state to a radio resource control connected with connected discontinuous reception state upon providing the leave indication based on the configuration (e.g., similar to the transition from the state at 306 or 316 to the state at 326 of FIG. 3). Additionally, or alternatively, the configured transitioning may include transitioning the first identity from the radio resource control connected with connected discontinuous reception state to the radio resource control connected state upon a second identity module (e.g., USIM-A) transitioning from the radio resource control connected state to a radio resource control idle state or a radio resource control inactive state prior to expiration of a first timer (e.g., similar to that at 302 of FIG. 4).

Additionally, or alternatively, the configured transitioning may include transitioning the first identity from the radio resource control connected with connected discontinuous reception state to the radio resource control inactive state after expiration of the first timer (e.g., similar to that at 404 of FIG. 4). Additionally, or alternatively, the configured transitioning may include transitioning the first identity from the radio resource control inactive state to the radio resource control connected state upon the second identity module being transitioned from the radio resource control connected state to the radio resource control idle state or the radio resource control inactive state prior to expiration of a second timer (e.g., similar to that at 502 of FIG. 5). Additionally, or alternatively, the configured transitioning may include transitioning the first identity module from the radio resource control inactive state to the radio resource control idle state after expiration of the second timer (e.g., similar to that at 504 of FIG. 5).

As described above, FIG. 7 is provided as an example. Other examples are possible according to some embodiments.

Figures 8A, 8B:
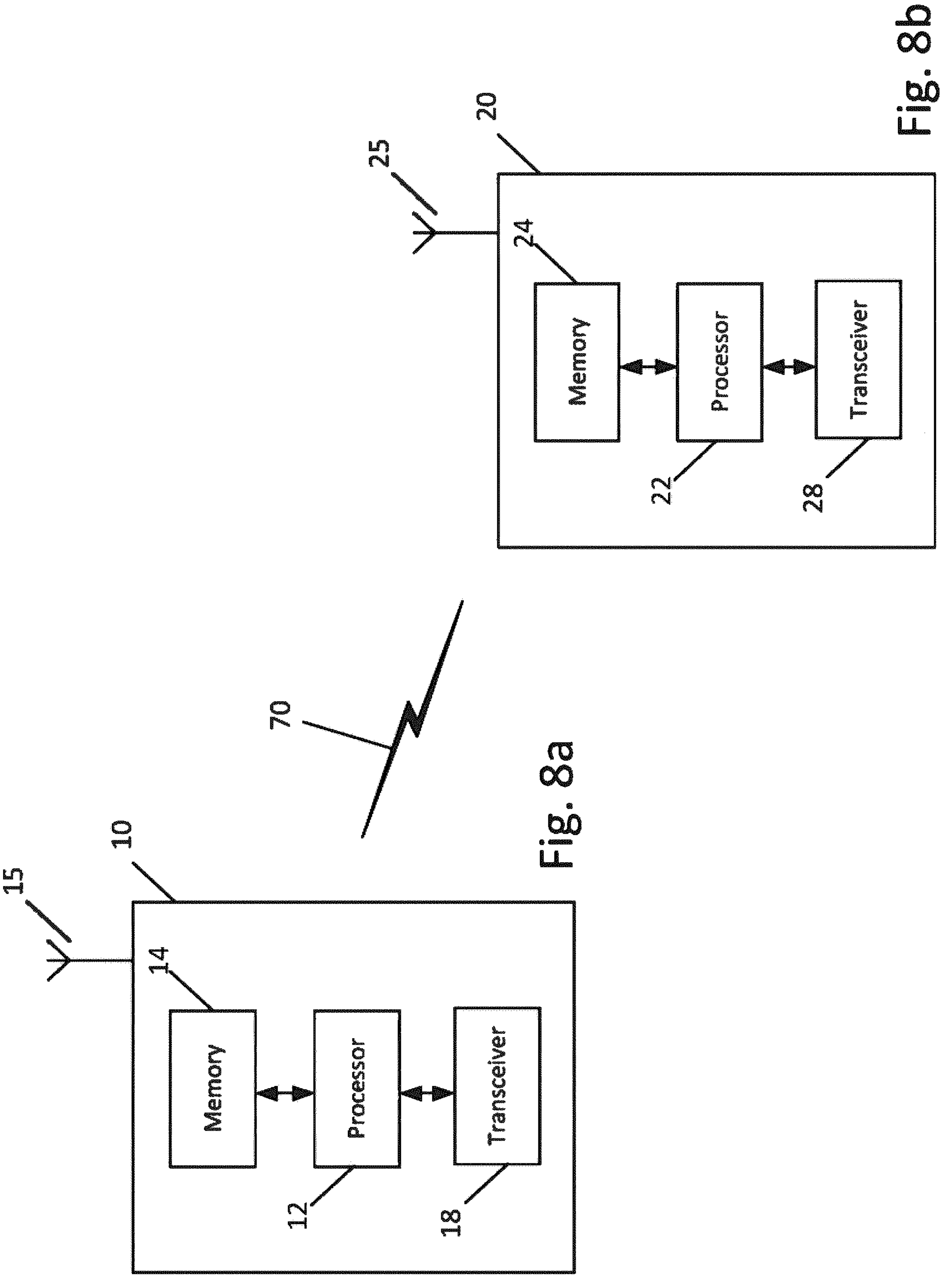
FIG. 8*b*** illustrates an example block diagram of an apparatus, according to another embodiment.

FIG. 8*a* illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8*a*.

As illustrated in the example of FIG. 8*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-6. For instance, apparatus 10 may be controlled by memory 14 and processor 12 to perform the method of FIG. 7.

FIG. 8*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8*b*.

As illustrated in the example of FIG. 8*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-6. For instance, in one embodiment, apparatus 20 may be controlled by memory 24 and processor 22 to perform the method of FIG. 6.

In some embodiments, an apparatus (e.g., apparatus 10 and/or apparatus 20) may include means for performing a method or any of the variants discussed herein, e.g., a method described with reference to FIGS. 5-6. Examples of the means may include one or more processors, memory, and/or computer program code for causing the performance of the operation.

Therefore, certain example embodiments provide several technological improvements, enhancements, and/or advantages over existing technological processes. For example, some benefits of some example embodiments is faster switching of an RRC-connection across MUSIMs when a UE cannot maintain more than one simultaneous RRC connection, reducing or eliminating delay related to a UE notifying a network of its switch from the network for MUSIM purposes, and more efficient RRC state change. Accordingly, the use of some example embodiments results in improved functioning of communications networks and their nodes and, therefore constitute an improvement at least to the technological field of RRC connection switching, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single UE equally applies to embodiments that include multiple instances of the UE, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

MO Mobile Originated
MT Mobile Terminated
MUSIM Multiple USIM
UE User Equipment
RRC Radio Resource Control
PO Paging Occasion
SIB System Information Block
C-DRX Connected Discontinuous Reception

We claim:

1. A method, comprising:

providing, by a user equipment to one or more network nodes corresponding to one or more identity modules of the user equipment, information that the user equipment supports a leave indication from a network connection without waiting for an acknowledgement;

receiving, from the one or more network nodes based on supporting the leave indication, a configuration for transitioning the one or more identity modules of one or more user equipment instances of the user equipment between radio resource control states, wherein the one or more identity modules are associated with the leave indication;

providing, to a first network node, the leave indication for leaving the network connection associated with a first identity module of the user equipment, wherein the user equipment is in a radio resource control connected state to the first network node, wherein the leave indication implies the transitioning; and transitioning a first radio resource control state of the first identity module to one of the one or more other radio resource control states based on satisfaction of one or more conditions upon providing the leave indication based on the received configuration, wherein the one or more conditions comprise expiration of one or more timers.

2. The method according to claim 1, wherein the first identity module comprises a first user subscriber identity module and a second identity module comprises a second user subscriber identity module.

3. The method according to claim 1, wherein the transitioning of the first identity module comprises:

transitioning the first radio resource control state from the radio resource control connected state to a radio resource control connected with connected discontinuous reception state upon providing the leave indication based on the configuration;

transitioning a second radio resource control state from a radio resource control idle state or a radio resource control inactive state to the radio resource control connected state;

starting a first timer;

transitioning the first identity module from the radio resource control connected with connected discontinuous reception state to the radio resource control connected state upon a second identity module transitioning from the radio resource control connected state to the radio resource control idle state or the radio resource control inactive state prior to expiration of the first timer; and stopping the first timer.

4. The method according to claim 1, wherein the transitioning of the first identity module comprises:

transitioning the first radio resource control state from the radio resource control connected state to a radio resource control connected with connected discontinuous reception state upon providing the leave indication based on the configuration;

transitioning a second radio resource control state from a radio resource control idle state or a radio resource control inactive state to the radio resource control connected state;

starting a first timer;

transitioning the first identity module from the radio resource control connected with connected discontinuous reception state to a radio resource control inactive state based on expiration of the first timer; and starting a second timer.

5. The method according to claim 4, wherein the transitioning of the first identity module comprises:

transitioning the first identity module from the radio resource control inactive state to the radio resource control connected state upon a second identity module transitioning from the radio resource control connected state to the radio resource control idle state or the radio resource control inactive state prior to expiration of the second timer; and stopping the second timer.

6. The method according to claim 4, wherein the transitioning of the first identity module or the second identity module comprises:

transitioning the first identity module from the radio resource control inactive state to the radio resource control idle state after expiration of the second timer; and maintaining the second identity module in the radio resource control connected state after expiration of the second timer.

7. The method according to claim 1, wherein the configuration comprises at least:

a radio resource control state upon providing the leave indication, and at least one other radio resource control state upon an occurrence of the one or more conditions or based on expiration of one or more timers.

8. An apparatus, comprising:

at least one processor; and at least one memory comprising computer program code, the at least one memory and computer program code configured, with the at least one processor, to cause the apparatus at least to:

provide, by the apparatus to one or more network nodes corresponding to one or more identity modules of the user equipment, information that the apparatus supports a leave indication from a network connection without waiting for an acknowledgement;

receive, from the one or more network nodes based on supporting the leave indication, a configuration for transitioning the one or more identity modules of one or more user equipment instances of the apparatus between radio resource control states, wherein the one or more identity modules are associated with the leave indication;

provide, to a first network node, the leave indication for leaving the network connection associated with a first identity module of the apparatus, wherein the user equipment is in a radio resource control connected state to the first network node, wherein the leave indication implies the transitioning; and transition a first radio resource control state of the first identity module to one of the one or more other radio resource control states based on satisfaction of one or more conditions upon providing the leave indication based on the received configuration, wherein the one or more conditions comprise expiration of one or more timers.

9. The apparatus according to claim 8, wherein the first identity module comprises a first user subscriber identity module and a second identity module comprises a second user subscriber identity module.

10. The apparatus according to claim 8, wherein the at least one memory and the computer program code are configured to, with the at least one processor, further cause the apparatus, when transitioning the first identity module, at least to:

transition the first radio resource control state from the radio resource control connected state to a radio resource control connected with connected discontinuous reception state upon providing the leave indication based on the configuration;

transition a second radio resource control state from a radio resource control idle state or a radio resource control inactive state to the radio resource control connected state;

start a first timer;

transition the first identity module from the radio resource control connected with connected discontinuous reception state to the radio resource control connected state upon a second identity module transitioning from the radio resource control connected state to the radio resource control idle state or the radio resource control inactive state prior to expiration of the first timer; and stop the first timer.

11. The apparatus according to claim 8, wherein the at least one memory and the computer program code are configured to, with the at least one processor, further cause the apparatus, when transitioning the first identity module, at least to:

transition the first radio resource control state from the radio resource control connected state to a radio resource control connected with connected discontinuous reception state upon providing the leave indication based on the configuration;

transition a second radio resource control state from a radio resource control idle state or a radio resource control inactive state to the radio resource control connected state;

start a first timer;

transition the first identity module from the radio resource control connected with connected discontinuous reception state to a radio resource control inactive state based on expiration of the first timer; and start a second timer.

12. The apparatus according to claim 11, wherein the at least one memory and the computer program code are configured to, with the at least one processor, further cause the apparatus, when transitioning the first identity module, at least to:

transition the first identity module from the radio resource control inactive state to the radio resource control connected state upon a second identity module transitioning from the radio resource control connected state to the radio resource control idle state or the radio resource control inactive state prior to expiration of the second timer; and stop the second timer.

13. The apparatus according to claim 11, wherein the at least one memory and the computer program code are configured to, with the at least one processor, further cause the apparatus, when transitioning the first identity module, at least to:

transition the first identity module from the radio resource control inactive state to the radio resource control idle state after expiration of the second timer; and maintain the second identity module in the radio resource control connected state after expiration of the second timer.

14. The apparatus according to claim 8, wherein the configuration comprises at least:

a radio resource control state upon providing the leave indication, and at least one other radio resource control state upon an occurrence of the one or more conditions or based on expiration of one or more timers.

15. An apparatus, comprising:

at least one processor; and at least one memory comprising computer program code, the at least one memory and computer program code configured, with the at least one processor, to cause the apparatus at least to:

receive, by the apparatus, information that a user equipment supports a leave indication from a network connection without waiting for an acknowledgement; and send a configuration associated with transitioning one or more identity modules of one or more user equipment instances of the user equipment between radio resource control states based on satisfaction of one or more conditions, wherein the one or more conditions comprise expiration of one or more timers.

16. The apparatus according to claim 15, wherein the configuration comprises the one or more radio resource control states and values for the one or more timers.

17. The apparatus according to claim 15, wherein the one or more configured radio resource control states comprise one or more of:

a radio resource control connected state, a radio resource control connected with connected discontinuous reception state, a radio resource control idle state, or a radio resource control inactive state.

18. The apparatus according to claim 15, wherein the configured transitioning includes one or more of:

transitioning a first identity module from a radio resource control connected state to a radio resource control connected with connected discontinuous reception state upon providing the leave indication based on the configuration, transitioning the first identity form the radio resource control connected with connected discontinuous reception state to the radio resource control connected state upon the second identity transitioning from the radio resource control connected state to a radio resource control idle state or a radio resource control inactive state prior to expiration of a first timer, transitioning the first identity from the radio resource control connected with connected discontinuous reception state to the radio resource control inactive state after expiration of the first timer, transitioning the first identity from the radio resource control inactive state to the radio resource control connected state upon the second identity module being transitioned from the radio resource control connected state to the radio resource control idle state or the radio resource control inactive state prior to expiration of a second timer, or transitioning the first identity module from the radio resource control inactive state to the radio resource control idle state after expiration of the second timer.

* * * * *